Figure 4:
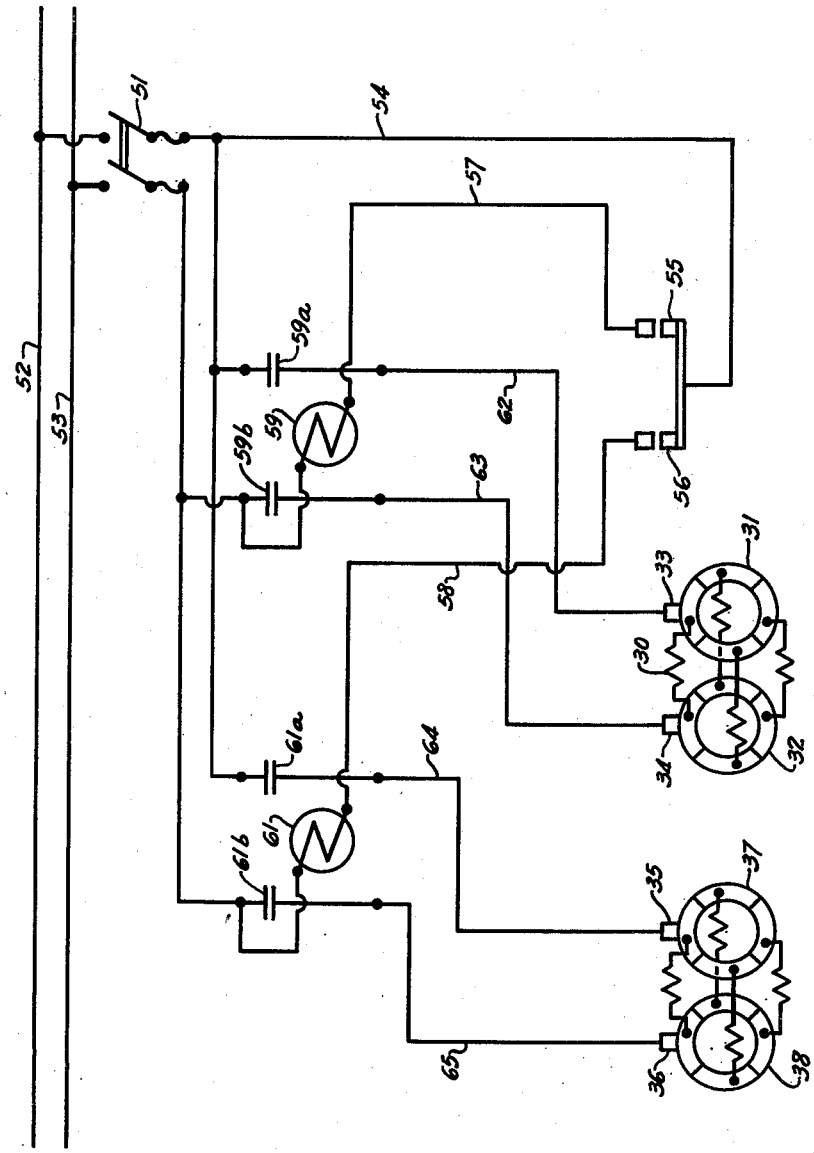

Dec. 11, 1956  H. C. WESTIN  2,773,595
CLASSIFYING APPARATUS
Filed Nov. 20, 1951  2 Sheets-Sheet 1
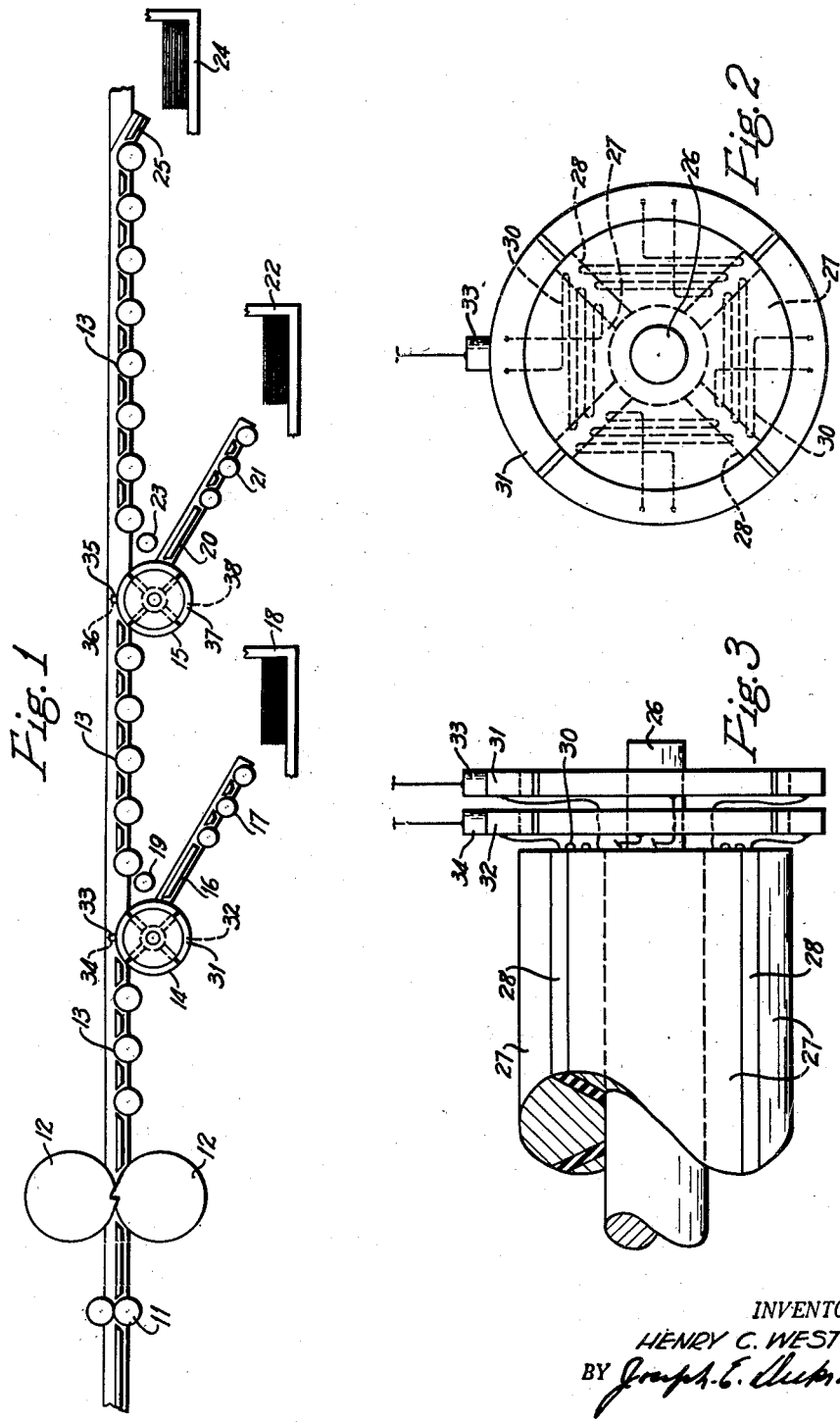
INVENTOR.
HENRY C. WESTIN
BY
HIS ATTORNEY Dec. 11, 1956   H. C. WESTIN   2,773,595
CLASSIFYING APPARATUS
Filed Nov. 20, 1951   2 Sheets-Sheet 2

INVENTOR.
HENRY C. WESTIN
BY Joseph E. Dickinson
HIS ATTORNEY

United States Patent Office 2,773,595
Patented Dec. 11, 1956

2,773,595

CLASSIFYING APPARATUS

Henry C. Westin, Turtle Creek, Pa., assignor to United Engineering and Foundry Company, Pittsburgh, Pa., a corporation of Pennsylvania Application November 20, 1951, Serial No. 257,277

4 Claims. (Cl. 209—74)

This invention relates to apparatus for classifying metallic sheets and, in particular, to the classification and sorting of ferrous sheets such as tin plate and the like, though not necessarily limited thereto, and the gathering thereof into separate groups or piles comprising under-gauge, over-gauge and on-gauge grades.

Apparatus of various types have been heretofore proposed and employed for the sorting of metal sheets but due to the high speed with which shearing lines, for example, are operated and with which the invention is particularly adapted to be incorporated, difficulties have been experienced due either to the slowness or the failure of operation of conventional devices thereby causing jamming of the sheets along the run-out table. Such devices normally employ mechanically operable elements in the form of guides, gates and the like which are apt to cause damage to the leading end of a rapidly moving sheet when the sheet strikes against it and is deflected away from the conveyor.

The invention herein defined contemplates the use of a flying micrometer located preferably just ahead of a flying shear through which continuous sheet material is passed to be severed into lengths of a given size and subsequently passed along a conveyor to be sorted. Electrical elements contained within the flying micrometer are so arranged as to energize a portion of one of two segmental electromagnetic sheet deflecting rolls, depending upon whether the material passing through the flying micrometer is over or under the desired gauge, so that the off-gauge material will be selected by the proper electromagnetic deflector roll and deposited upon a piler. The controls actuated by the flying micrometer employ a time delay relay which will cause current to flow to collector rings by which segments of the electromagnetic roll are energized at the proper instant and for the length of time necessary to engage a particular off-gauge sheet and remove it from the conveyor. On-gauge material will pass uninterruptedly over the conveyor and the two electromagnetic rolls to an on-gauge piler at the discharge end of the conveyor.

One of the objects of this invention is to provide electromagnetic deflector apparatus for selectively withdrawing and sorting over and under-gauge sheets being passed over a conveyor.

Another object of this invention is to provide a classifying and sheet sorting apparatus in which a minimum of mechanically operable elements are employed.

Still another object of this invention is to provide an electromagnetic means for engaging off-gauge sheets, deflecting the leading end portion thereof away from the main conveyor and then releasing the sheets and permitting them to pass over a gravity conveyor and on to a piler.

A further object of this invention is to provide sheet classifying and sorting apparatus which is relatively economical to construct and maintain in service.

These objects, as well as the various other novel features and advantages of this invention, will be apparent from the description and accompanying drawings of which:

Figure 1 is a side elevation view of a portion of a shearing line embodying the features of the invention herein disclosed, Fig. 2 is an enlarged side elevation view of one of the electromagnetic sheet deflector rolls shown in Figure 1, Figure 3 is an end view of the electromagnetic sheet deflector roll shown in Figure 2, and Figure 4 is an electrical wiring diagram showing the various electrical elements employed for energizing and de-energizing the electromagnetic rolls.

With reference to Figure 1 there is shown therein a flying micrometer 11, a flying shear having rotatable blade carriers 12, a driven roll conveyor table 13 and driven electro-magnetic under-gauge and over-gauge sheet deflector rolls 14 and 15 mounted on the conveyor so that their upper surfaces are in alignment with the conveyor table rolls and normally assist in directing on-gauge sheets along the conveyor to the discharge end thereof.

Adjacent to the electromagnetic under-gauge roll 14 there is a stationary stripper 16 which is adapted to engage with the leading end of a sheet deflected downward by the roll 14 for insuring passage of the sheet over a gravity conveyor 17 on to a piler 18. Below the conveyor and above the stripper 16 there is provided a guide roll 19 for assisting in guiding under-gauge sheets to the piler.

Similarly, the electromagnetic over-gauge sheet deflector roll 15 is provided with a stripper 20, a gravity conveyor 21, a piler 22 and a guide roll 23. The spacing between the guide roll 23 and the roll 15 as well as that between the guide roll 19 and the roll 14 may be modified in order to make certain that the end of a sheet deflected from its horizontal path will pass between the guide roll and stripper and be directed to the proper piler.

At the end of the conveyor 13 there is a piler 24 on to which on-gauge sheets are directed by an inclined guide 25.

As shown in Figure 2, the electromagnetic under-gauge sheet deflector roll 14 consists of a shaft 26 upon which there are mounted four soft iron segments 27 with spacers 28 therebetween, each segment having a coil 30 wrapped thereon with its ends connected to adjacent segments of two four-segmental collector rings 31 and 32. Current for energizing the coils of the roll 14 is carried to the collector rings 31 and 32 by brushes 33 and 34 respectively.

The over-gauge electromagnetic sheet deflector roll 15 is constructed similarly to the roll 14, the current being supplied by brushes 35 and 36 to the segmental collector rings 37 and 38 respectively.

Power is supplied to the electrical system as shown in Figure 4, through a fused switch 51 connected to two power lines 52 and 53. From one of the open terminals of the switch 51 a conductor 54 is connected to one side of the flying micrometer under-gauge and over-gauge contacts 55 and 56 respectively. The other side of the contacts 55 and 56 are connected by conductors 57 and 58 respectively through adjustable time delay relays 59 and 61 to the opposite terminal of the switch 51. Brushes 33 and 34 are provided with conductors 62 ad 63 respectively connected to time delay relay contacts 59a and 59b and to opposite switch terminals. Similarly, over-gauge brushes 35 and 36 are provided with conductors 64 and 65 respectively connected to time delay relay contacts 61a and 61b and to opposite switch terminals. The segmental collector rings 31 and 32, which supply energizing current to the coils 30 of under-gauge deflector roll 14, are shown in contact with their respective brushes 33 and 34 and the segmental collector rings 37 and 38, which supply current for energizing the coils of over-gauge deflector roll 15, in contact with their respective brushes 35 and 36.

Operation of the apparatus may be briefly summarized as follows:

So long as the continuous strip metal passing through the flying micrometer is within the on-gauge limits, sheets severed therefrom by the flying shear 12 pass over the conveyor 13 and rolls 14 and 15 to the on-gauge piler 24 and the rolls 14 and 15 remain in their neutral or non-energized condition. Suppose, for example, that under-gauge material passes between the micrometer rolls. Immediately the under-gauge contact 55 closes thus energizing the solenoid of time delay relay 59, and on closing of the contacts 59a and 59b, the coil of roll 14 is energized which is connected to the segments of the collector rings 31 and 32 in contact at the instant with the brushes 33 and 34. The time delay relay 59 is so adjusted that current will be supplied to and energize the coil at the top of the roll 14 at the same time the leading end of the under-gauge sheet contacts the top of the roll. Current will continue to flow to the coil for the length of time required for one complete segmental collector ring element to pass into and out of contact with the brush, at the end of which time the relay 59 returns to its initial position. Thus, a sheet drawn into contact with the magnetized roll will be directed between the guide roll 19 and the stripper 16 and pass to the piler 18.

Likewise, when over-gauge material passes between the flying micrometer rolls, contact 56 closes thus energizing the solenoid of time delay relay 61 to close contacts 61a and 61b. Current will then flow to the collector rings 37 and 38 at the proper instant so that the deflector roll 15 will be magnetized at the same time the leading end of the over-gauge sheet comes in contact therewith, thus causing the sheet to be gripped by the magnetized roll 15 and directed downward between the guide roll 23 and the stripper 20 to the piler 22.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. Apparatus for classifying and sorting according to thickness workpieces such as tin plate and the like comprising a conveyor defining a normal path of travel for said workpieces, a gauging means, a piler adjacent to and for receiving from said conveyor on-gauge workpieces having thicknesses within predetermined limits, a second piler adjacent to and for receiving from said conveyor workpieces having thicknesses less than those within said limits, a third piler adjacent to and for receiving from said conveyor workpieces having thicknesses greater than those contained within said limits, adjacent to each of said second and third pilers and serving as conveyor rolls for said conveyor an annular rotary electromagnet having a plurality of separately energizable segmental members spaced around the periphery thereof adapted to be selectively energized to engage with and to direct an off-gauge workpiece to the proper off-gauge piler, control elements so disposed and arranged with respect to said gauging means and said segments of said electromagnets to energize at least one of the electromagnetic members in timed relation with the arrival of a workpiece at a point adjacent to the electromagnet at the proper off-gauge piler thereby to cause said members to engage with and deflect the workpiece out of its normal path of travel and to de-energize said member at a point beyond said point of energization and stripping means adjacent to each of said rotary electromagnets for assisting in releasing a workpiece from said magnets.

2. Apparatus for classifying and sorting according to thickness workpieces such as tin plate and the like comprising a conveyor defining a normal path of travel for said workpieces, gauging means, a piler adjacent to and for receiving from said conveyor on-gauge workpieces having thicknesses within predetermined limits, a second piler adjacent to and for receiving from said conveyor workpieces having thicknesses less than those within said limits, a third piler adjacent to and for receiving from said conveyor workpieces having thicknesses greater than those contained within said limits, adjacent to each of said second and third pilers and serving as conveyor rolls for said conveyor an annular rotary electromagnet having a plurality of separately energizable segmental members spaced around the periphery thereof adapted to be selectively energized to engage with and to direct an off-gauge workpiece to the proper off-gauge piler, and control elements so disposed and arranged with respect to said gauging means and said segments of said electromagnets to energize at least one of the electromagnetic segmental members in timed relation with the arrival of a workpiece at a point adjacent to the electromagnet at the proper off-gauge piler thereby to cause said members to engage with and deflect the workpiece out of its normal path of travel, and to de-energize said member at a point beyond said point of energization thus to release the workpiece so engaged to direct it to the respective off-gauge piler.

3. Apparatus for classifying and sorting according to thickness workpieces such as tin plate and the like comprising a driven roll conveyor defining a normal path of travel for said workpieces, a piler adjacent to said conveyor for receiving from said conveyor on-gauge workpieces having thicknesses within predetermined limits, a second piler adjacent to said conveyor for receiving from said conveyor workpieces of a thickness out of conformance with said limits, a cylindrical electromagnet rotatable about its central axis serving as one of the rolls of said conveyor, said electromagnet having four segmental separately energized electromagnetic members equally spaced around the circumference therof, gauging means responsive to workpieces having thicknesses out of conformance with said limits, control elements so disposed and arranged with respect to said gauging means and said rotary electromagnet as to energize at least one of the electromagnetic segmental members thereof in timed relation with the arrival of a workpiece at a point adjacent said segmental member thereby to draw the workpiece into contact therewith thus on further rotation of said electromagnet to deflect the workpiece out of its normal path of travel and to de-energize said member at a point beyond said point of energization thus to release the workpiece so engaged and direct it toward said second piler.

4. Apparatus for classifying and sorting according to thickness workpieces such as tin plate and the like comprising a driven roll conveyor defining a normal path of travel for said workpieces, a piler adjacent to said conveyor for receiving from said conveyor on-gauge workpieces having thicknesses within predetermined limits, a second piler adjacent to said conveyor for receiving from said conveyor workpieces of a thickness out of conformance with said limits, a cylindrical electromagnet, the segmental poles thereof being rotatable about a central axis, serving as one of the rolls of said conveyor, gauging means responsive to workpieces having thicknesses out of conformance with said limits, control elments so disposed and arranged with respect to said gauging means and said rotary electromagnet as to energize said magnet in timed relation with the arrival of a workpiece at a point adjacent said magnet thereby to engage with and to direct an off-gauge workpiece to the said off-gauge piler and to de-energize said electromagnet on further rotation thereof.

(References on following page)

References Cited in the file of this patent

UNITED STATES PATENTS

| | | | |
|---|---|---|---|
| 1,048,824 | Griffith | Dec. 31, | 1912 |
| 1,444,999 | Bennett et al. | Feb. 13, | 1923 |
| 1,812,505 | Wertz | June 20, | 1931 |
| 1,982,607 | Flynn | Nov. 27, | 1934 |
| 2,008,200 | Clauss | July 16, | 1935 |
| 2,146,581 | Kaufman | Feb. 7, | 1939 |
| 2,303,526 | Cummings et al. | Dec. 1, | 1942 |
| 2,312,357 | Odquist et al. | Mar. 2, | 1943 |
| 2,430,526 | Mirfield et al. | Nov. 11, | 1947 |
| 2,433,685 | Dowell | Dec. 30, | 1947 |
| 2,570,288 | Todd | Oct. 9, | 1951 |
| 2,660,318 | Watson | Nov. 24, | 1953 |
| 2,700,465 | Pechy et al. | Jan. 25, | 1955 |